US010343679B2

(12) United States Patent
Okada

(10) Patent No.: US 10,343,679 B2
(45) Date of Patent: Jul. 9, 2019

(54) HYBRID VEHICLE AND CONTROL METHOD OF HYBRID VEHICLE

(71) Applicant: Toyota Jidosha Kabushiki Kaisha, Toyota-shi Aichi-ken (JP)

(72) Inventor: Ayumu Okada, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 16/020,360

(22) Filed: Jun. 27, 2018

(65) Prior Publication Data

US 2019/0047548 A1 Feb. 14, 2019

(30) Foreign Application Priority Data

Aug. 10, 2017 (JP) .................. 2017-155121

(51) Int. Cl.
*B60W 20/40* (2016.01)
*B60W 30/18* (2012.01)
*B60W 50/08* (2012.01)
B60W 50/14 (2012.01)
B60W 50/04 (2006.01)

(52) U.S. Cl.
CPC ...... *B60W 20/40* (2013.01); *B60W 30/18054* (2013.01); *B60W 50/082* (2013.01); *B60W 2050/046* (2013.01); *B60W 2050/146* (2013.01); *B60W 2510/0642* (2013.01); *B60W 2550/22* (2013.01); *B60W 2550/406* (2013.01)

(58) Field of Classification Search
CPC ............... B60W 20/40; B60W 50/082; B60W 30/18054; B60W 2050/046; B60W 2550/22; B60W 2050/146; B60W 2550/406; B60W 2510/0642
See application file for complete search history.

(56) References Cited

U.S. PATENT DOCUMENTS

| 5,150,034 | A * | 9/1992 | Kyoukane | ................ | B60K 6/46 322/10 |
| 7,657,350 | B2 * | 2/2010 | Moran | ..................... | B60K 6/12 701/22 |
| 7,657,351 | B2 * | 2/2010 | Moran | ..................... | B60K 6/12 701/22 |

(Continued)

FOREIGN PATENT DOCUMENTS

| JP | 2014-090526 A | 5/2014 |
| JP | 2015-120433 A | 7/2015 |
| JP | 2015122892 A | 7/2015 |

*Primary Examiner* — Jacob B Meyer
(74) *Attorney, Agent, or Firm* — Dinsmore & Shohl LLP

(57) ABSTRACT

An electronic control unit is configured to execute control for executing the external power supply by selecting one of a first power supply mode in which the engine and the generator are actuated to execute the external power supply and a second power supply mode in which the engine and the generator are stopped and the external power supply is executed by using the electric power stored in the power storage device, acquire a current location of the hybrid vehicle, acquire first information indicative of an area where an idle operation of the engine during parking is prohibited, and select the second power supply mode when the current location is in the area indicated by the first information at the time of executing the external power supply.

7 Claims, 8 Drawing Sheets

(56) References Cited

U.S. PATENT DOCUMENTS

| | | | | |
|---|---|---|---|---|
| 7,680,568 B2* | 3/2010 | Moran | | B60K 6/12 |
| | | | | 701/22 |
| 7,689,330 B2* | 3/2010 | Moran | | B60K 6/12 |
| | | | | 701/22 |
| 7,689,331 B2* | 3/2010 | Moran | | B60K 6/12 |
| | | | | 701/22 |
| 8,972,152 B2* | 3/2015 | Boesch | | F02N 11/0837 |
| | | | | 123/179.2 |
| 9,047,719 B2* | 6/2015 | Yagi | | F02N 11/0814 |
| 9,224,255 B2* | 12/2015 | Yagi | | G07C 5/0808 |
| 9,245,393 B2* | 1/2016 | Yagi | | G07C 5/008 |
| 9,456,302 B2* | 9/2016 | Skomra | | H04W 4/02 |
| 9,545,847 B2* | 1/2017 | Honda | | B60L 3/00 |
| 10,097,122 B1* | 10/2018 | Schwulst | | F02D 41/1456 |
| 2006/0116797 A1* | 6/2006 | Moran | | B60K 6/12 |
| | | | | 701/22 |
| 2007/0124037 A1* | 5/2007 | Moran | | B60K 6/12 |
| | | | | 701/22 |
| 2008/0097661 A1* | 4/2008 | Moran | | B60K 6/12 |
| | | | | 701/22 |
| 2008/0147260 A1* | 6/2008 | Moran | | B60K 6/12 |
| | | | | 701/22 |
| 2008/0177434 A1* | 7/2008 | Moran | | B60K 6/12 |
| | | | | 701/22 |
| 2010/0087973 A1* | 4/2010 | Kaita | | B60K 6/445 |
| | | | | 701/22 |
| 2010/0145562 A1* | 6/2010 | Moran | | B60K 6/46 |
| | | | | 701/22 |
| 2013/0110374 A1* | 5/2013 | Boesch | | F02N 11/0837 |
| | | | | 701/102 |
| 2013/0110376 A1* | 5/2013 | Surnilla | | F02D 41/042 |
| | | | | 701/103 |
| 2014/0167944 A1* | 6/2014 | Yamaguchi | | B60K 37/02 |
| | | | | 340/439 |
| 2014/0350775 A1* | 11/2014 | Yagi | | G07C 5/008 |
| | | | | 701/31.4 |
| 2014/0357295 A1* | 12/2014 | Skomra | | H04W 4/02 |
| | | | | 455/456.1 |
| 2014/0358359 A1* | 12/2014 | Yagi | | F02N 11/0814 |
| | | | | 701/31.4 |
| 2014/0379200 A1* | 12/2014 | Yagi | | G07C 5/0808 |
| | | | | 701/29.4 |
| 2015/0175008 A1* | 6/2015 | Honda | | B60L 3/00 |
| | | | | 701/22 |
| 2015/0300172 A1* | 10/2015 | Haskew | | G01M 15/102 |
| | | | | 700/275 |
| 2017/0230790 A1* | 8/2017 | Skomra | | H04W 4/02 |
| 2017/0355373 A1* | 12/2017 | Dalum | | B60W 20/10 |
| 2018/0273018 A1* | 9/2018 | Follen | | B60W 10/30 |
| 2019/0047548 A1* | 2/2019 | Okada | | B60W 20/40 |

* cited by examiner

FIG. 2

| MUNICIPALITY | PRESENCE/ABSENCE OF ORDINANCE |
|---|---|
| A | 1 |
| B | 0 |
| C | 1 |
| D | 1 |
| E | 0 |
| ... | ... |

HYBRID VEHICLE AND CONTROL METHOD OF HYBRID VEHICLE

CROSS-REFERENCE TO RELATED APPLICATIONS

This application claims priority to Japanese Patent Application No. 2017-155121 filed on Aug. 10, 2017, which is incorporated herein by reference in its entirety including the specification, drawings and abstract.

BACKGROUND

1. Technical Field

The present disclosure relates to a hybrid vehicle and a control method of a hybrid vehicle and, in particular to, a hybrid vehicle and a control method of a hybrid vehicle capable of executing external power supply for supplying electric power from the vehicle to outside of the vehicle.

2. Description of Related Art

A vehicle capable of executing external power supply for supplying electric power from the vehicle to outside of the vehicle has been known. For example, a hybrid vehicle is disclosed in Japanese Patent Application Publication No. 2015-122892 (JP 2015-122892 A). The hybrid vehicle can select one of an HV power supply mode in which the external power supply is executed in conjunction with actuation of an engine and a motor generator and an EV power supply mode in which the external power supply is executed by using a power storage device in a state where the actuation of those is stopped (see JP 2015-122892 A).

SUMMARY

In the hybrid vehicle disclosed in JP 2015-122892 A, a switching operation section that is operated by a user is provided in a power supply connector, and one of the HV power supply mode and the EV power supply mode is selected in accordance with an operation of the switching operation section by the user.

There is a case where the external power supply in the HV power supply mode, in which the engine is actuated during parking, is not preferred depending on a location where the external power supply is executed. For example, in the case where a municipality enacts an ordinance prohibiting an idle operation of the engine during parking, the external power supply in the HV power supply mode possibly violates the ordinance in an area of such a municipality. When the user selects the power supply mode in the above case, the user has to research in advance whether the engine can be actuated (run at idle) during parking at a location where the user attempts the external power supply. As a result, convenience of the external power supply is possibly degraded.

The disclosure provides a hybrid vehicle and a control method of a hybrid vehicle capable of improving user's convenience at the time of executing external power supply, the hybrid vehicle capable of executing the external power supply for supplying electric power from the vehicle to outside of the vehicle.

An exemplary aspect of the present disclosure is a hybrid vehicle configured to execute external power supply for supplying electric power from the vehicle to outside of the vehicle. The hybrid vehicle includes: a power storage device; an engine; a generator configured to generate the electric power by using output of the engine; and an electronic control unit configured to execute control for executing the external power supply by selecting one of a first power supply mode in which the engine and the generator are actuated to execute the external power supply and a second power supply mode in which the engine and the generator are stopped and the external power supply is executed by using the electric power stored in the power storage device, acquire a current location of the hybrid vehicle, acquire first information indicative of an area where an idle operation of the engine during parking is prohibited (an idle operation prohibition area), and select the second power supply mode when the current location is in the area indicated by the first information at the time of executing the external power supply.

An exemplary aspect of the present disclosure is a control method of a hybrid vehicle configured to execute external power supply for supplying electric power from the vehicle to outside of the vehicle. The hybrid vehicle includes a power storage device, an engine, a generator configured to generate the electric power by using output of the engine, and an electronic control unit. The control method includes: executing, by the electronic control unit, the external power supply by selecting one of a first power supply mode in which the engine and the generator are actuated to execute the external power supply and a second power supply mode in which the engine and the generator are stopped and the external power supply is executed by using the electric power stored in the power storage device; acquiring, by the electronic control unit, a current location of the hybrid vehicle; acquiring, by the electronic control unit, first information indicative of an area where an idle operation of the engine during parking is prohibited (an idle operation prohibition area); and selecting, by the electronic control unit, the second power supply mode when the current location is in the area indicated by the first information at the time of executing the external power supply.

In the hybrid vehicle and the control method thereof described above, the information indicative of the idle operation prohibition area where the idle operation of the engine during parking is prohibited is acquired. In the case where the current location is in the idle operation prohibition area at the time of executing the external power supply, the second power supply mode is selected. In this way, a user does not have to research in advance whether the location where the user attempts to execute the external power supply is in the idle operation prohibition area. Therefore, according to this hybrid vehicle and this control method thereof, the user's convenience during execution of the external power supply can be improved.

The hybrid vehicle may further include a detector configured to detect a situation around the hybrid vehicle. The electronic control unit may be configured to select the second power supply mode when the electronic control unit determines that the hybrid vehicle is located indoors on the basis of second information output by the detector and the current location is not in the area.

In this way, it is possible to prevent the inside of a building from being filled with exhaust gas due to selection of the first power supply mode indoors.

The hybrid vehicle may further comprising a detector configured to detect a situation around the hybrid vehicle. The electronic control unit may be configured to execute the external power supply in a mode selected by a user from the first power supply mode and the second power supply mode when the current location is not in the area and the electronic control unit determines that the hybrid vehicle is located outdoors on the basis of second information output by the detector.

With such a configuration, the user can select a desired power supply mode from the first power supply mode and the second power supply mode.

The hybrid vehicle may further include an alarm configured to notify the user of selection of the second power supply mode due to a fact that the current location is in the area when the current location is in the area at the time of executing the external power supply.

In this way, the user can recognize a reason why the second power supply mode is selected. The electronic control unit may be configured to acquire the first information from a server located the outside of the vehicle via a communication network. In this way, there is no need to maintain the information indicative of the idle operation prohibition area in the vehicle, and thus the power supply mode can be selected by acquiring the latest information from the server.

The hybrid vehicle may further comprising a storage device configured to store the first information. The electronic control unit may be configured to acquire the first information from the storage device.

With such a configuration, the server that is located on the outside of the vehicle and manages the information indicative of the idle operation prohibition area becomes unnecessary.

According to the hybrid vehicle of the present disclosure, the user's convenience during the execution of the external power supply can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a table of exemplary data of municipalities, each of which enacts an idle operation prohibition ordinance and is registered in a server;

DETAILED DESCRIPTION OF EMBODIMENTS

Figure 1:
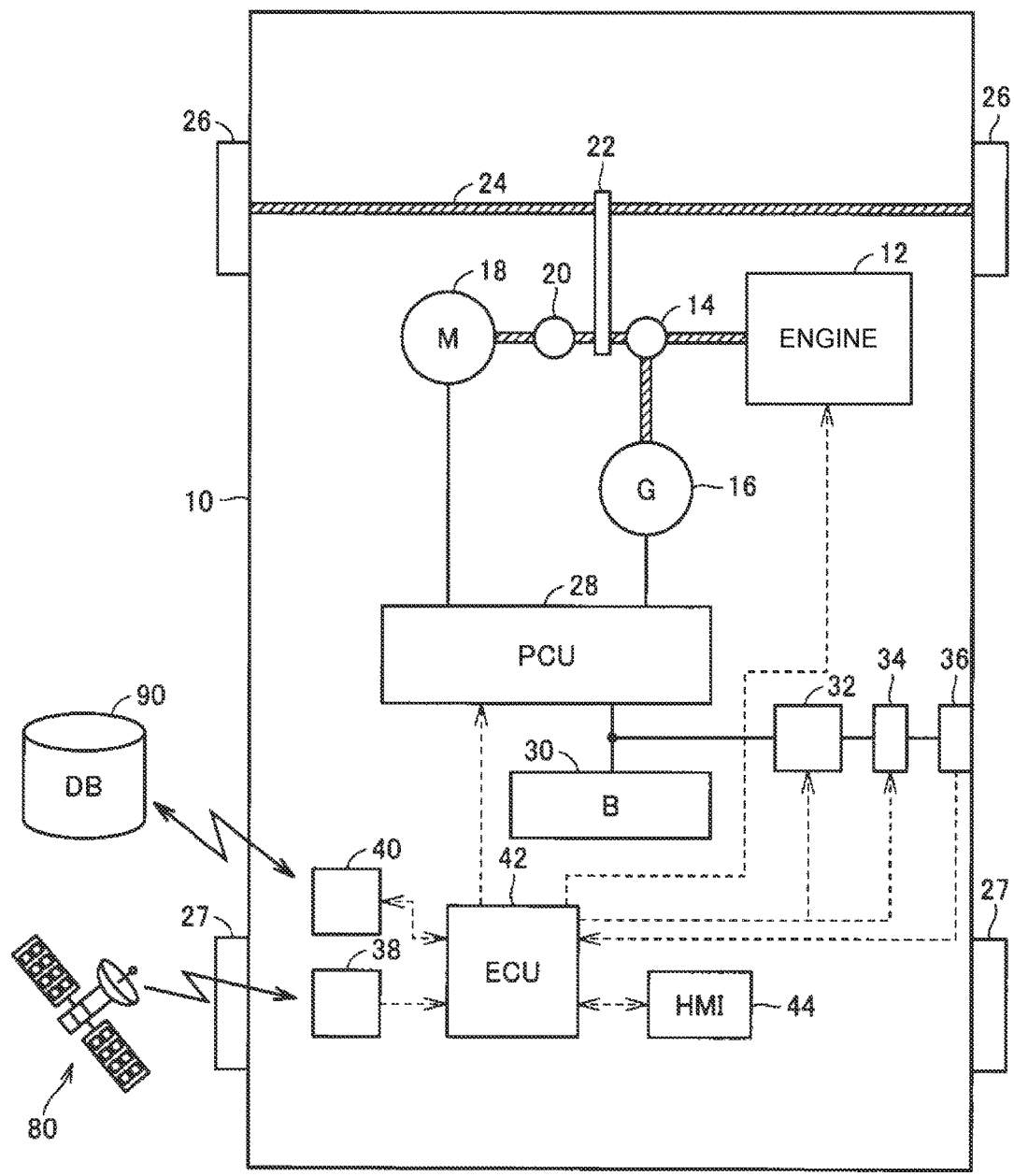
FIG. 1 is a block diagram illustrating an overall configuration of a hybrid vehicle according to a first embodiment of the present disclosure.

A detailed description will hereinafter be made on embodiments of the present disclosure with reference to the drawings. Note that the same or corresponding portions in the drawings are denoted by the same reference numerals and the description thereon will not be repeated.

FIG. 1 is a block diagram illustrating an overall configuration of a hybrid vehicle according to a first embodiment of the present disclosure. Referring to FIG. 1, a hybrid vehicle 10 includes an engine 12, a power split device 14, a generator 16, a motor 18, a reduction gear 20, a transmission gear 22, a driveshaft 24, drive wheels 26, a power control unit (hereinafter also referred to as a "PCU") 28, and a power storage device 30.

The engine 12 is an internal combustion engine that outputs power by converting thermal energy produced by combustion of fuel to kinetic energy of motion elements such as a piston and a rotor. As the fuel of the engine 12, hydrocarbon-based fuel such as gasoline, diesel oil, ethanol, or natural gas is suited.

The power split device 14 includes a planetary gear mechanism that has three rotational shafts of a sun gear, a carrier, and a ring gear, for example. The power split device 14 splits the drive power of the engine 12 into power transmitted to a rotational shaft of the generator 16 and power transmitted to the transmission gear 22. The transmission gear 22 is coupled to the driveshaft 24 for driving the drive wheels 26. The transmission gear 22 is also coupled to the reduction gear 20.

Each of the generator 16 and the motor 18 is an AC rotary electric machine and is a three-phase AC synchronous electric motor in which a permanent magnet is embedded in a rotor, for example. The generator 16 generates electric power when receiving the drive power of the engine 12 through the power split device 14, and outputs the generated electric power to the PCU 28. Note that the generator 16 can also be actuated as a motor and is also used as a motor for starting the engine 12.

When receiving the electric power from the PCU 28, the motor 18 generates the drive power for driving the driveshaft 24 and outputs the generated drive power to the reduction gear 20. The reduction gear 20 reduces a rotational speed of the motor 18, amplifies torque, and transmits output of the motor 18 to the transmission gear 22. Note that the motor 18 can also be actuated as a generator and generates regenerative power by receiving a rotational force of the driveshaft 24 via the transmission gear 22 and the reduction gear 20 during braking of the vehicle or a reduction in acceleration on a downhill road.

The PCU 28 converts DC power received from the power storage device 30 to AC power for driving the motor 18. In addition, the PCU 28 converts the AC power generated by the generator 16 to the DC power for charging the power storage device 30. Note that, at a start of the engine 12, the PCU 28 converts the DC power received from the power storage device 30 to the AC power for driving the generator 16. Furthermore, during braking of the vehicle or the reduction in the acceleration on the downhill road, the PCU 28 converts the AC power generated by the motor 18 to the DC power for charging the power storage device 30. The PCU 28 is configured by including: two inverters provided in a manner to correspond to the generator 16 and the motor 18; and a converter that boosts a DC voltage supplied to each of the inverters to be equal to or higher than a voltage of the power storage device 30, for example.

The power storage device 30 is a rechargeable DC power source and is configured by including a secondary battery such as a nickel-metal hydride battery or a lithium-ion battery, a capacitor of large capacitance, and the like, for example. The power storage device 30 supplies the electric power to the PCU 28. The power storage device 30 receives the generated electric power from the PCU 28 and is thus charged during the power generation by the generator 16 or the motor 18.

The hybrid vehicle 10 further includes a power converter 32, a power supply relay 34, and a power supply port 36. The power converter 32 converts at least one of the electric power stored in the power storage device 30 and the electric power generated by the generator 16 and received via the PCU 28 to a specified voltage (for example, a voltage of a commercial system power source that is used at a current location of the hybrid vehicle 10). The power converter 32 is configured by including a rectifier and an inverter, for example.

The power supply relay 34 is provided between the power converter 32 and the power supply port 36, is turned on (closed) during execution of external power supply, and is turned off (opened) during non-execution of the external power supply. The power supply port 36 is configured to be connectable to a power supply connector (not shown) that is provided in a power supply cable on the outside of the vehicle. When the power supply connector is connected to the power supply port 36, the power supply port 36 outputs a signal indicative of connection of the power supply connector to an ECU 42 (will be described below) and outputs the electric power received from the power converter 32 to the power supply cable.

The hybrid vehicle 10 further includes: a Global Positioning System (GPS) reception section 38, a data acquisition section 40, an electronic control unit (hereinafter also referred to as an "ECU") 42, and a human-machine interface (HMI) unit 44. The GPS reception section 38 acquires the current location of the hybrid vehicle 10 on the basis of a signal (a radio wave) from a GPS satellite 80 and outputs a signal indicative of the current location to the ECU 42.

The data acquisition section 40 acquires information (first information) indicative of an area where an idle operation of the engine during parking is prohibited from a server 90 on the outside of the vehicle via a wireless communication network. As one example, a list of municipalities, each of which enacts an ordinance prohibiting the idle operation of the engine during parking (hereinafter also referred to as an "idle operation prohibition ordinance") is registered in the server 90 on the outside of the vehicle. Then, during the execution of the external power supply from the power supply port 36, the list of the municipalities, each of which enacts the idle operation prohibition ordinance, is acquired from the server 90 by the data acquisition section 40 via the communication network and is output to the ECU 42. A detailed description will be made below on data acquired by the data acquisition section 40 and a method of using the data.

The ECU 42 includes a central processing unit (CPU), read only memory (ROM) that stores a processing program and the like, random access memory (RAM) that temporarily stores the data, input/output ports used to input/output various signals, and the like (none of them is shown), and controls each equipment in the hybrid vehicle 10. Note that these types of the control are not only processed by software but can also be processed by dedicated hardware (an electronic circuit).

As main control of the ECU 42, the ECU 42 calculates vehicle drive torque (a requested value) on the basis of a vehicle speed and an accelerator operation amount corresponding to an accelerator pedal operation amount, and calculates vehicle drive power (a requested value) on the basis of the calculated vehicle drive torque. The ECU 42 further calculates requested charging power of the power storage device 30 on the basis of a state of charge (SOC) of the power storage device 30. Then, the ECU 42 controls the engine 12 and the PCU 28 such that the vehicle generates power that is a sum of the vehicle drive power and the requested charging power.

In addition, when the power supply connector of the power supply cable is connected to the power supply port 36 and the external power supply is requested through an operation of the HMI unit 44 by the user or the like, the ECU 42 outputs an ON command to the power supply relay 34 and outputs a drive signal to the power converter 32. In this way, the ECU 42 executes the external power supply from the power supply port 36.

In regard to the execution of the external power supply, the ECU 42 executes the external power supply by selecting one of an HV power supply mode (a first power supply mode) and an EV power supply mode (a second power supply mode). The HV power supply mode is a mode in which the external power supply is executed in conjunction with actuation of the engine 12 and the generator 16 and the electric power generation by the engine 12 and the generator 16. In the case where the HV power supply mode is selected, the ECU 42 controls the engine 12 and the PCU 28 such that the generator 16 generates the electric power by using the output of the engine 12. Meanwhile, the EV power supply mode is a mode in which the engine 12 and the generator 16 are stopped and the external power supply is executed by using the electric power stored in the power storage device 30.

Here, there is a case where the external power supply in the HV power supply mode, in which the engine 12 is actuated during parking, is not preferred depending on a location where the external power supply is executed. More specifically, there is the municipality that enacts the idle operation prohibition ordinance prohibiting the idle operation of the engine during parking. Thus, in an area of the municipality that enacts such an idle operation prohibition ordinance, the external power supply in the HV power supply mode possibly violates the ordinance. In the case where the user selects the power supply mode in the above case, the user has to research in advance whether the engine can be actuated (run at idle) during parking at the location where the user attempts the external power supply, and thereafter has to select the power supply mode. As a result, convenience of the external power supply is possibly degraded.

In view of the above, in this first embodiment, the list of the municipalities, each of which enacts the idle operation prohibition ordinance, is registered in the server 90. Then, in the hybrid vehicle 10 according to this first embodiment, the data acquisition section 40 acquires the list (data) of the municipalities, each of which enacts the idle operation prohibition ordinance, from the server 90 at the time of executing the external power supply. In the case where the current location of the hybrid vehicle 10 is in the area of the municipality that enacts the idle operation prohibition ordinance, the ECU 42 selects the EV power supply mode. In this way, the user does not have to research in advance whether the location where the user attempts the external power supply is an idle operation prohibition area. Thus, the user's convenience during the execution of the external power supply can be improved.

Note that, in the hybrid vehicle 10 according to this first embodiment, in the case where the idle operation prohibition ordinance is not enacted in the municipality of the current location where the external power supply is executed, the user can command the power supply mode through the HMI unit 44. Then, the ECU 42 selects the power supply mode in accordance with the user's command through the HMI unit 44.

The HMI unit 44 is a unit that provides various types of information on the hybrid vehicle 10 to the user (representatively a driver). A representative example of the HMI unit 44 is a display that is provided in a cabin of the hybrid vehicle 10, and includes a speaker and the like. The HMI unit 44 provides the various types of the information to the user by outputting visual information (graphic information, textual information), audio information (voice information, sound information), and the like.

In the hybrid vehicle 10 according to this first embodiment, in the case where the idle operation prohibition ordinance is not enacted in the municipality of the current location at the time of executing the external power supply, the HMI unit 44 displays a screen (a mode selection screen) on which the user commands the power supply mode. Then, the HMI unit 44 sends the power supply mode, which is commanded by the user on the mode selection screen, to the ECU 42.

Meanwhile, in the case where the current location of the hybrid vehicle 10 is in the area of the municipality that enacts the idle operation prohibition ordinance at the time of executing the external power supply, the HMI unit 44 displays that the EV power supply mode is selected due to the idle operation prohibition ordinance. In this way, the user can recognize that the EV power supply mode is forcibly selected due to the idle operation prohibition ordinance.

FIG. 2 is a table of exemplary data of the municipalities, each of which enacts the idle operation prohibition ordinance and is registered in the server 90. Referring to FIG. 2, a database in the server 90 registers whether the idle operation prohibition ordinance is enacted in each of the municipalities across a nation. In a column of "PRESENCE/ABSENCE OF ORDINANCE", "1" indicates that the idle operation prohibition ordinance is enacted, and "0" indicates that the idle operation prohibition ordinance is not enacted. Here, only the municipalities, each of which enacts the idle operation prohibition ordinance, may be registered, and thus unregistered municipalities are the municipalities, each of which does not enact the idle operation prohibition ordinance.

Figure 3:
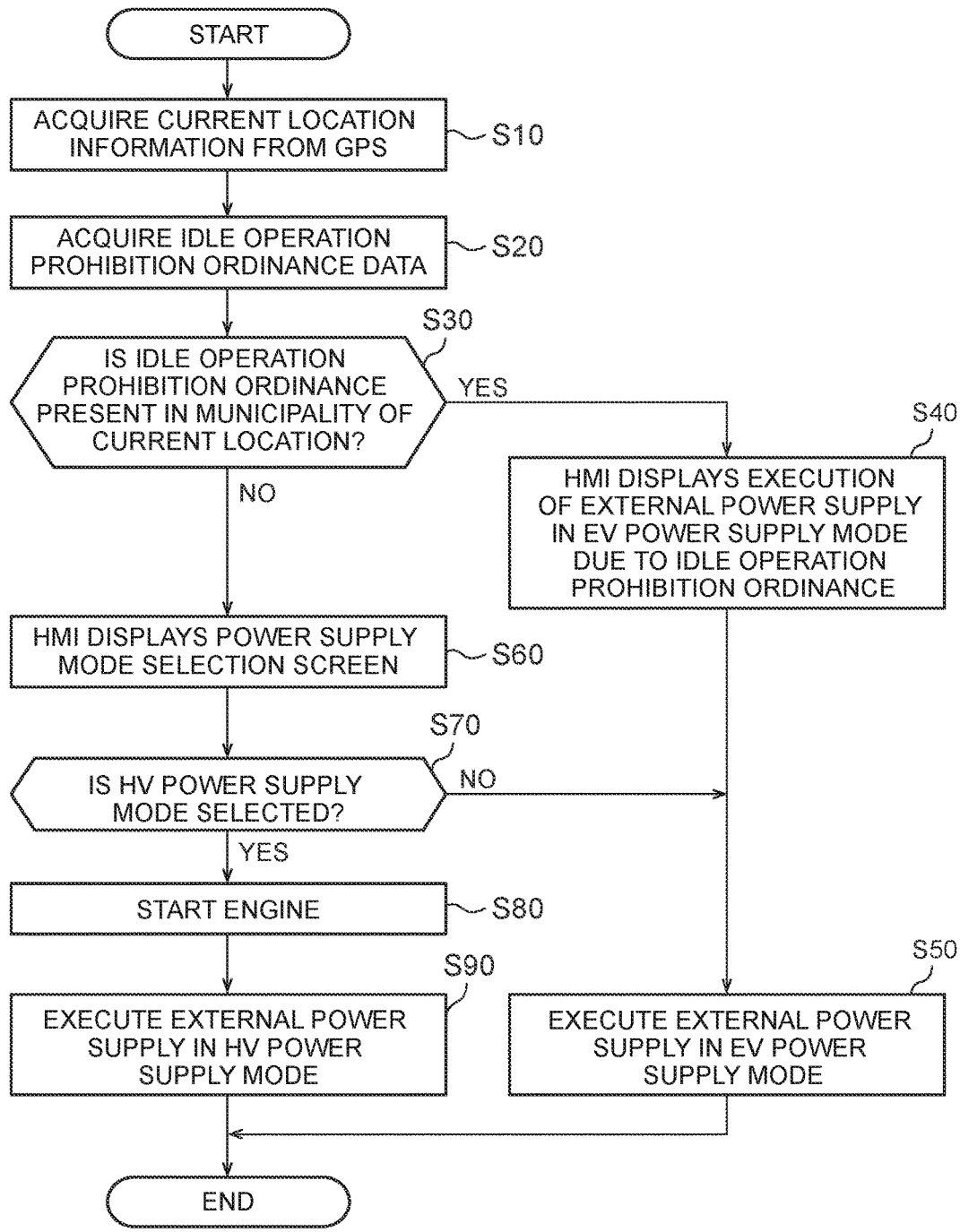
FIG. 3 is a flowchart illustrating a processing procedure executed by an ECU during external power supply.

FIG. 3 is a flowchart illustrating a processing procedure executed by the ECU 42 during the external power supply. The processing procedure of this flowchart is initiated when the connection of the power supply connector to the power supply port 36 is detected by the signal from the power supply port 36 and the user commands the initiation of the external power supply through the HMI unit 44 or the like, for example.

Referring to FIG. 3, the ECU 42 acquires current location information from the GPS reception section 38 that has received the current location information from the GPS satellite 80 (step S10). Next, the ECU 42 acquires idle operation prohibition ordinance data (the list of the municipalities, each of which enacts the idle operation prohibition ordinance) from the data acquisition section 40 that has acquired the idle operation prohibition ordinance data from the server 90 via the wireless communication network (step S20).

Then, the ECU 42 confirms whether the idle operation prohibition ordinance is enacted in the municipality of the current location of the hybrid vehicle 10 by referring to the idle operation prohibition ordinance data (step S30).

If it is confirmed that the idle operation prohibition ordinance is enacted in the municipality of the current location (YES in step S30), the ECU 42 notifies the HMI unit 44 of the execution of the external power supply in the EV power supply mode due to the idle operation prohibition ordinance, and the HMI unit 44 displays such a fact (step S40). Thereafter, the ECU 42 executes the external power supply in the EV power supply mode (step S50). More specifically, the ECU 42 outputs the ON command to the power supply relay 34 and outputs the drive signal to the power converter 32 but does not output a command to drive the engine 12 and the generator 16.

On the other hand, if it is confirmed in step S30 that the idle operation prohibition ordinance is not enacted in the municipality of the current location (NO in step S30), the ECU 42 notifies the HMI unit 44 to display the power supply mode selection screen on which the user commands the power supply mode, and the HMI unit 44 displays the power supply mode selection screen (step S60).

If the user selects the HV power supply mode on the HMI unit 44 (YES in step S70), the ECU 42 sends a signal for starting the engine 12 to the engine 12 and the PCU 28 and starts the engine 12 by using the generator 16 (step S80). Then, once the engine 12 is started, the ECU 42 executes the external power supply in the HV power supply mode (step S90). More specifically, the ECU 42 outputs the ON command to the power supply relay 34, outputs the drive signal to the power converter 32, and controls the engine 12 and the PCU 28 such that the generator 16 generates the electric power by using the output of the engine 12.

On the other hand, if the user selects the EV power supply mode on the HMI unit 44 (NO in step S70), the processing proceeds to step S50, and the ECU 42 executes the external power supply in the EV power supply mode.

As it has been described so far, in this first embodiment, the data acquisition section 40 acquires the data (the list) of the municipalities, each of which enacts the idle operation prohibition ordinance, from the server 90 on the outside of the vehicle. Then, in the case where the current location of the hybrid vehicle 10 is in the area of any one of the above municipalities at the time of executing the external power supply, the EV power supply mode is selected. In this way, the user does not have to research in advance whether the idle operation prohibition ordinance is enacted in the municipality of the location (the current location) where the user attempts the external power supply. Therefore, according to this first embodiment, the user's convenience during the execution of the external power supply can be improved.

In addition, in this first embodiment, in the case where the idle operation prohibition ordinance is enacted in the municipality of the current location at the time of executing the external power supply, the HMI unit 44 informs the user that the EV power supply mode is selected due to enactment of the idle operation prohibition ordinance. Therefore, according to this first embodiment, the user can recognize a reason why the EV power supply mode is selected.

Furthermore, in this first embodiment, the data (the list) of the municipalities, each of which enacts the idle operation prohibition ordinance, is registered in the server 90 on the outside of the vehicle, and the data acquisition section 40 of the vehicle acquires the above data of the municipalities from the server 90 via the wireless communication network. Thus, according to this first embodiment, the user does not have to maintain the data (the list) of the municipalities, each of which enacts the idle operation prohibition ordinance, in the vehicle and thus can select the power supply mode by acquiring the latest information from the server 90.

In the above first embodiment, the municipalities, each of which enacts the idle operation prohibition ordinance, are registered in the server 90 on the outside of the vehicle, and the data acquisition section 40 acquires the above data of the municipalities from the server 90 via the wireless communication network. However, the vehicle may own such data. In this way, the server 90 that is located on the outside of the vehicle and manages the data of the idle operation prohibition ordinance becomes unnecessary.

Figure 4:
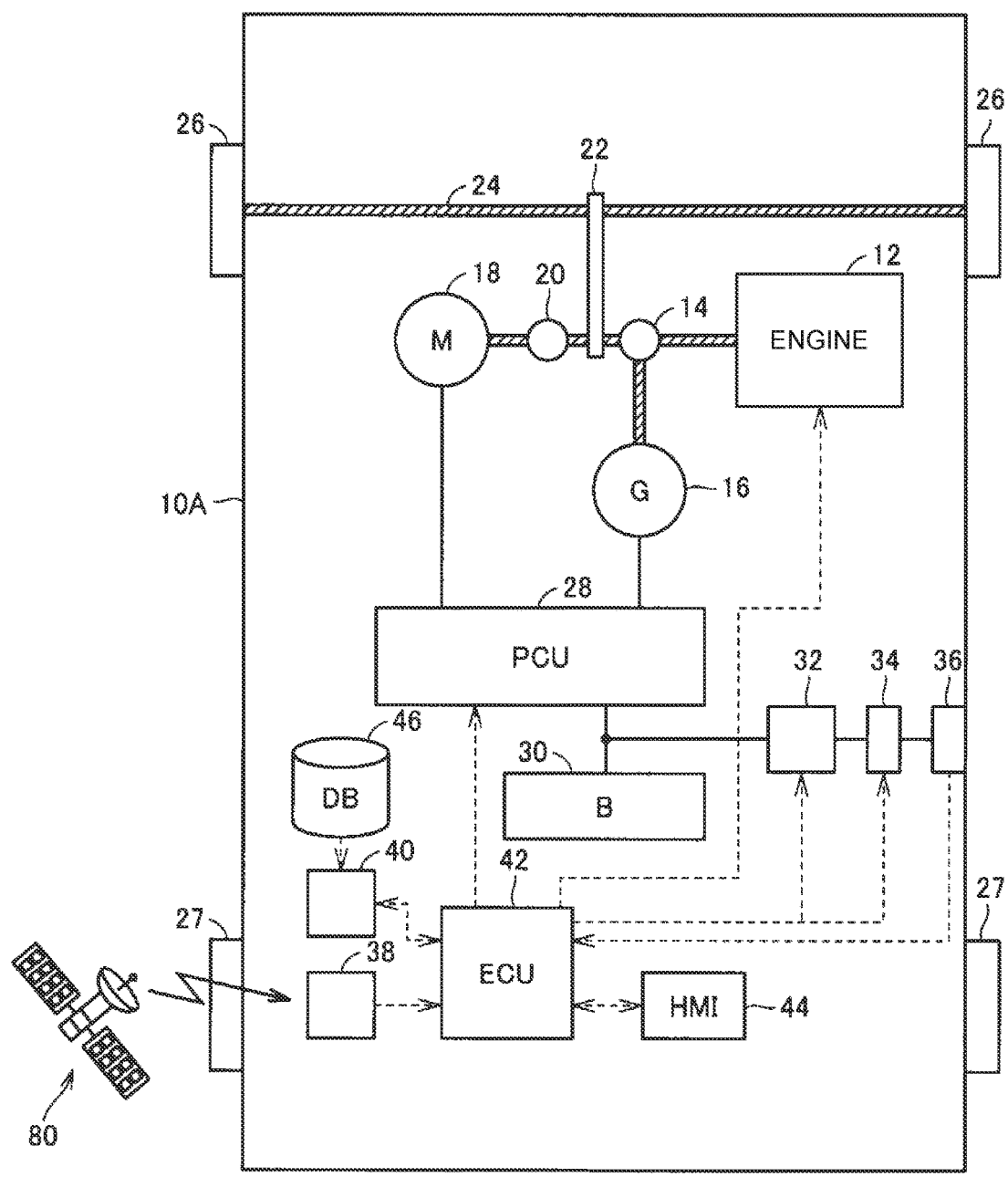
FIG. 4 is a block diagram illustrating an overall configuration of a hybrid vehicle according to a modified example.

FIG. 4 is a block diagram illustrating an overall configuration of a hybrid vehicle according to this modified example. Referring to FIG. 4, this hybrid vehicle 10A further includes a storage unit 46 in the hybrid vehicle 10 shown in FIG. 1.

The storage unit 46 stores the list (the data) of the municipalities, each of which enacts the idle operation prohibition ordinance. More specifically, the storage unit 46 stores the data as shown in FIG. 2. When the external power supply is executed, in response to a request from the data acquisition section 40, the above data that is stored in the storage unit 46 is read by the data acquisition section 40 and is output from the data acquisition section 40 to the ECU 42.

In a second embodiment, a detection unit (detector) that detects a situation around a vehicle, that is, second information is provided. When the external power supply is executed, the detection unit is used to confirm whether the vehicle is located indoors or outdoors. In the case where the vehicle is located indoors, the EV power supply mode is selected even when the idle operation prohibition ordinance is not enacted in the municipality of the current location where the external power supply is executed. In this way, it is possible to prevent the inside of a building from being filled with exhaust gas due to selection of the HV power supply mode indoors.

Figure 5:
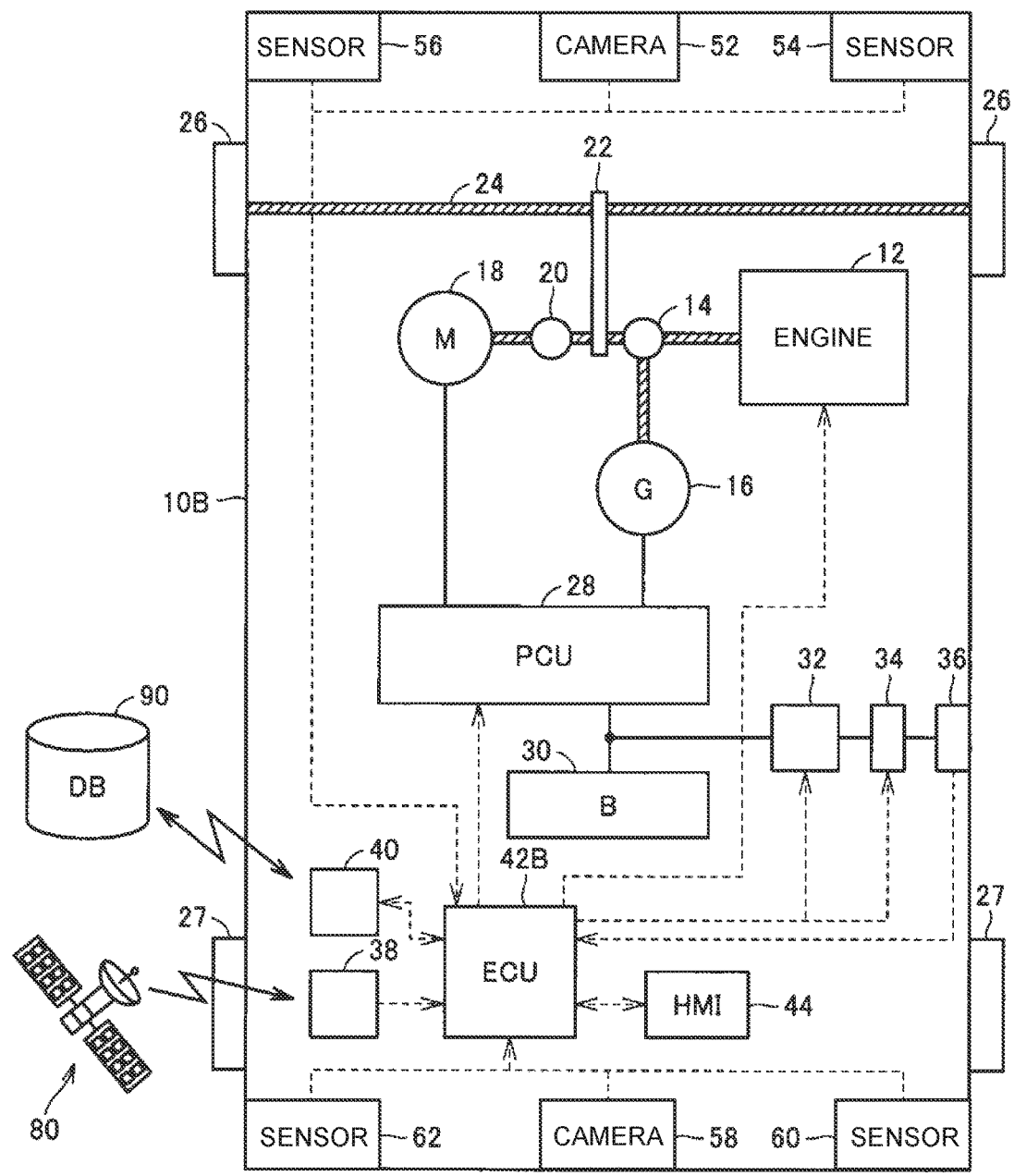
FIG. 5 is a block diagram illustrating an overall configuration of a hybrid vehicle according to a second embodiment.

FIG. 5 is a block diagram illustrating an overall configuration of a hybrid vehicle according to the second embodiment. Referring to FIG. 5, this hybrid vehicle 10B further includes cameras 52, 58 and sensors 54, 56, 60, 62 and includes an ECU 42B instead of the ECU 42 in the hybrid vehicle 10 shown in FIG. 1.

The cameras 52, 58 are disposed to capture images of a front side and a rear side of the hybrid vehicle 10B, respectively, and output the captured images to the ECU 42B. The sensors 54, 56, 60, 62 are corner sensors disposed at corners of the hybrid vehicle 10B and output detection signals to the ECU 42B. Each of the cameras 52, 58 and the sensors 54, 56, 60, 62 is the detection unit that detects a situation around the hybrid vehicle 10B.

The ECU 42B uses the captured images of the cameras 52, 58 and the detection signals of the sensors 54, 56, 60, 62 to determine whether the hybrid vehicle 10B is located indoors or outdoors. For example, in the case where presence of a wall on both of the front side and the rear side of the vehicle is recognized from the captured images of the cameras 52, 58 and all of the sensors 54, 56, 60, 62 are actuated, it is determined that the hybrid vehicle 10B is located indoors.

Then, in the case where it is determined that the hybrid vehicle 10B is located indoors at the time of executing the external power supply, the ECU 42B selects the EV power supply mode even when the current location is not in the area of the municipality that enacts the idle operation prohibition ordinance. On the other hand, in the cases where the idle operation prohibition ordinance is not enacted in the municipality of the current location where the external power supply is executed and it is determined that the hybrid vehicle 10B is located outdoors, the ECU 42B executes the external power supply in accordance with the power supply mode that is commanded by the user on the HMI unit 44.

Figure 6:
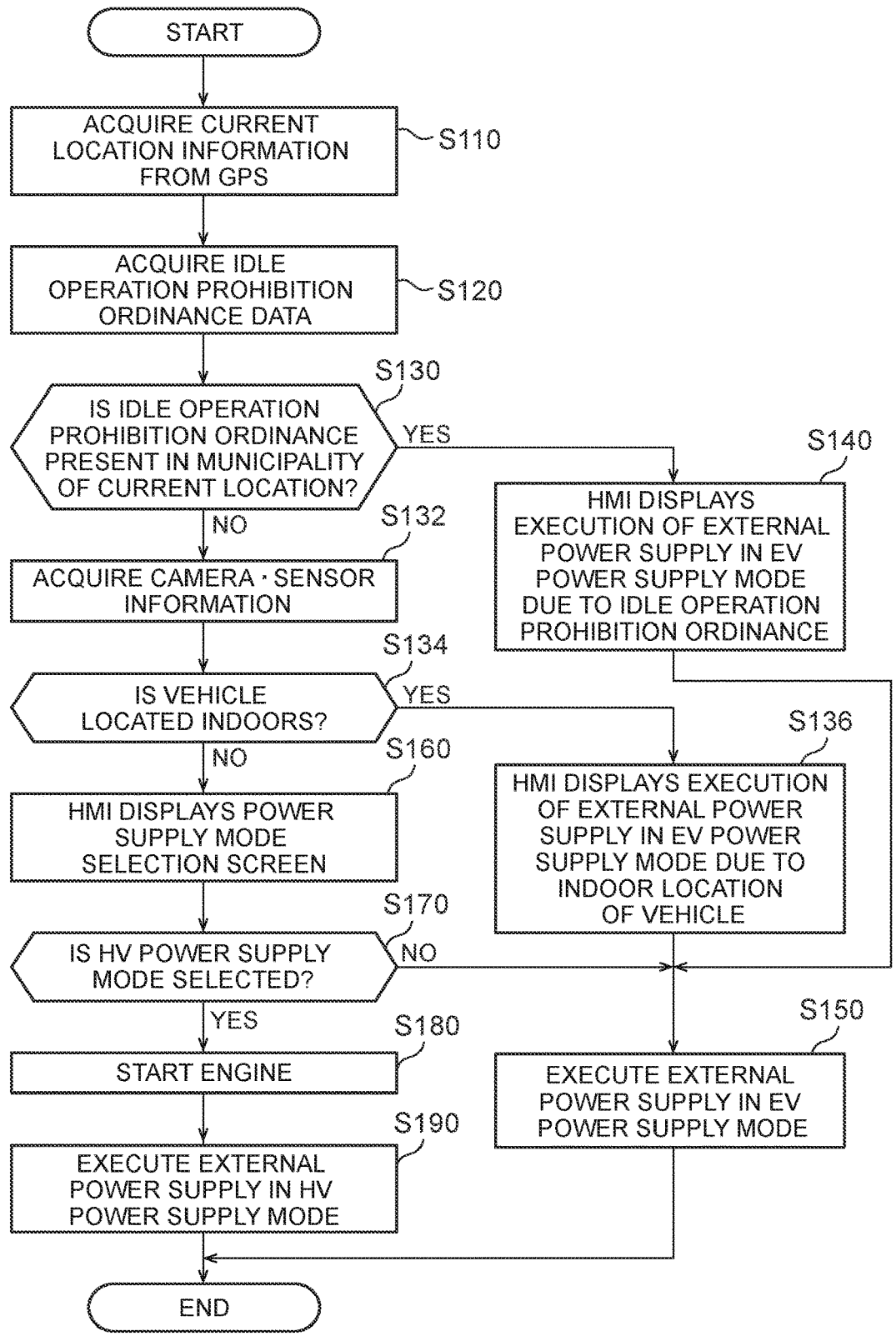
FIG. 6 is a flowchart illustrating a processing procedure executed by an ECU in the second embodiment during the external power supply.

FIG. 6 is a flowchart illustrating a processing procedure executed by the ECU 42B in the second embodiment during the external power supply. This flowchart corresponds to the flowchart in the first embodiment shown in FIG. 3. Also in this flowchart, the processing procedure is initiated when the connection of the power supply connector to the power supply port 36 is detected by the signal from the power supply port 36 and the user commands the initiation of the external power supply on the HMI unit 44 or the like, for example.

Referring to FIG. 6, processing in steps S110 to S150 is the same as the processing in steps S10 to S50 illustrated in FIG. 3. In step S130, if it is confirmed that the idle operation prohibition ordinance is not enacted in the municipality of the current location (NO in step S130), the ECU 42B acquires the captured images of the cameras 52, 58 and the detection signals of the sensors 54, 56, 60, 62 (step S132).

Next, the ECU 42B uses the information acquired from the cameras 52, 58 and the sensors 54, 56, 60, 62 to determine whether the hybrid vehicle 10B is located indoors (step S134). If it is determined that the hybrid vehicle 10B is located indoors (YES in step S134), the ECU 42B notifies the HMI unit 44 that the external power supply is executed in the EV power supply mode due to the indoor location of the hybrid vehicle 10B, and the HMI unit 44 displays such a fact (step S136). Thereafter, the processing proceeds to step S150, and the ECU 42B executes the external power supply in the EV power supply mode.

If it is determined in step S134 that the hybrid vehicle 10B is located outdoors (NO in step S134), the processing proceeds to step S160, and the HMI unit 44 displays the power supply mode selection screen. Note that, because processing in steps S160 to S190 is the same as the processing in steps S60 to S90 illustrated in FIG. 3, a description thereon will not be made.

As it has been described so far, in this second embodiment, the cameras 52, 58 and the sensors 54, 56, 60, 62 are provided to detect the situation around the hybrid vehicle 10B. In the case where it is determined that the hybrid vehicle 10B is located indoors by using the information acquired from the cameras 52, 58 and the sensors 54, 56, 60, 62, the EV power supply mode is selected even when the idle operation prohibition ordinance is not enacted in the municipality of the current location where the external power supply is executed. Therefore, according to this second embodiment, when the hybrid vehicle 10B is located indoors, it is possible to prevent the inside of the building from being filled with the exhaust gas due to the selection of the HV power supply mode.

In addition, according to this second embodiment, in the cases where the idle operation prohibition ordinance is not enacted in the municipality of the current location where the external power supply is executed and it is determined that the hybrid vehicle 10B is located outdoors, the user can select a desired power supply mode from the HV power supply mode and the EV power supply mode on the HMI unit 44.

Note that, in the above second embodiment, the two cameras 52, 58 and the four sensors 54, 56, 60, 62 are provided; however, the number and the arrangement of the cameras and the sensors are not limited thereto. For example, instead of the cameras 52, 58, a camera or a sensor that detects a situation above the vehicle can be provided to make an indoor determination with detection results of the sensors 54, 56, 60, 62.

In the above second embodiment, the situation around the vehicle is detected by the cameras 52, 58 and the sensors 54, 56, 60, 62, and then it is determined whether the vehicle is located indoors or outdoors. In this third embodiment, an oxygen sensor is provided instead of the cameras 52, 58 and the sensors 54, 56, 60, 62, and it is determined whether a vehicle is located indoors or outdoors on the basis of a detection value of the oxygen sensor.

Figure 7:
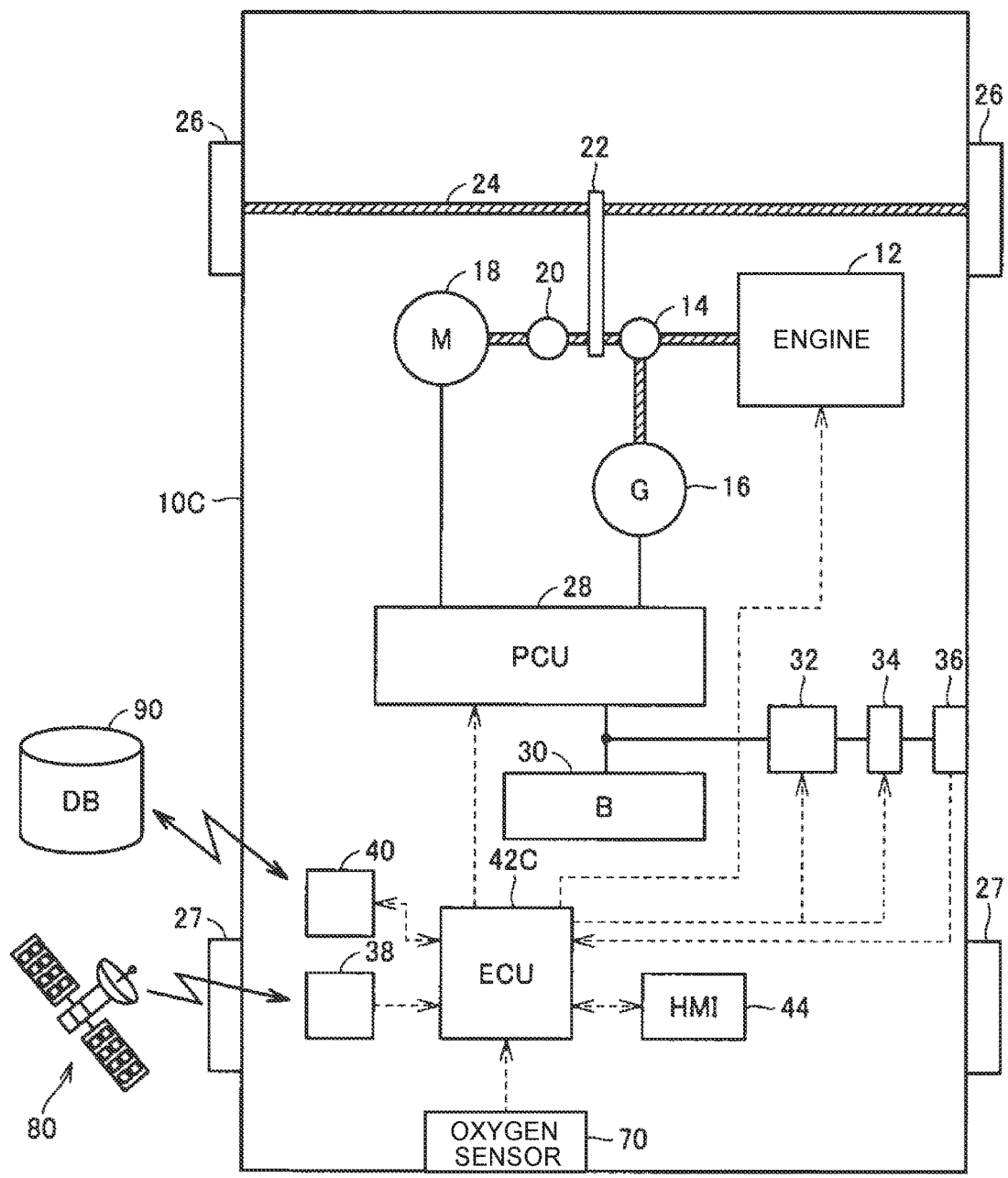
FIG. 7 is a block diagram illustrating an overall configuration of a hybrid vehicle according to a third embodiment.

FIG. 7 is a block diagram illustrating an overall configuration of a hybrid vehicle according to the third embodiment. Referring to FIG. 7, this hybrid vehicle 10C includes an oxygen sensor 70 instead of the cameras 52, 58 and the sensors 54, 56, 60, 62 and includes an ECU 42C instead of the ECU 42B in the hybrid vehicle 10B of the second embodiment shown in FIG. 5.

The oxygen sensor 70 detects concentration of oxygen around the hybrid vehicle 10C and outputs a detection value thereof to the ECU 42C. Note that, although the oxygen sensor 70 is arranged in a rear portion of the vehicle in FIG. 7, the arrangement of the oxygen sensor 70 is not limited thereto.

The ECU 42C uses the detection value of the oxygen sensor 70 to determine whether the hybrid vehicle 10C is located indoors or outdoors. For example, in the case where the engine 12 is actuated for specified duration and the concentration of oxygen detected by the oxygen sensor 70 falls below a specified value, the ECU 42C determines that the hybrid vehicle 10C is located indoors. Note that processing executed after determining whether the hybrid vehicle 10C is located indoors or outdoors is the same as that in the hybrid vehicle 10B of the second embodiment.

Figure 8:
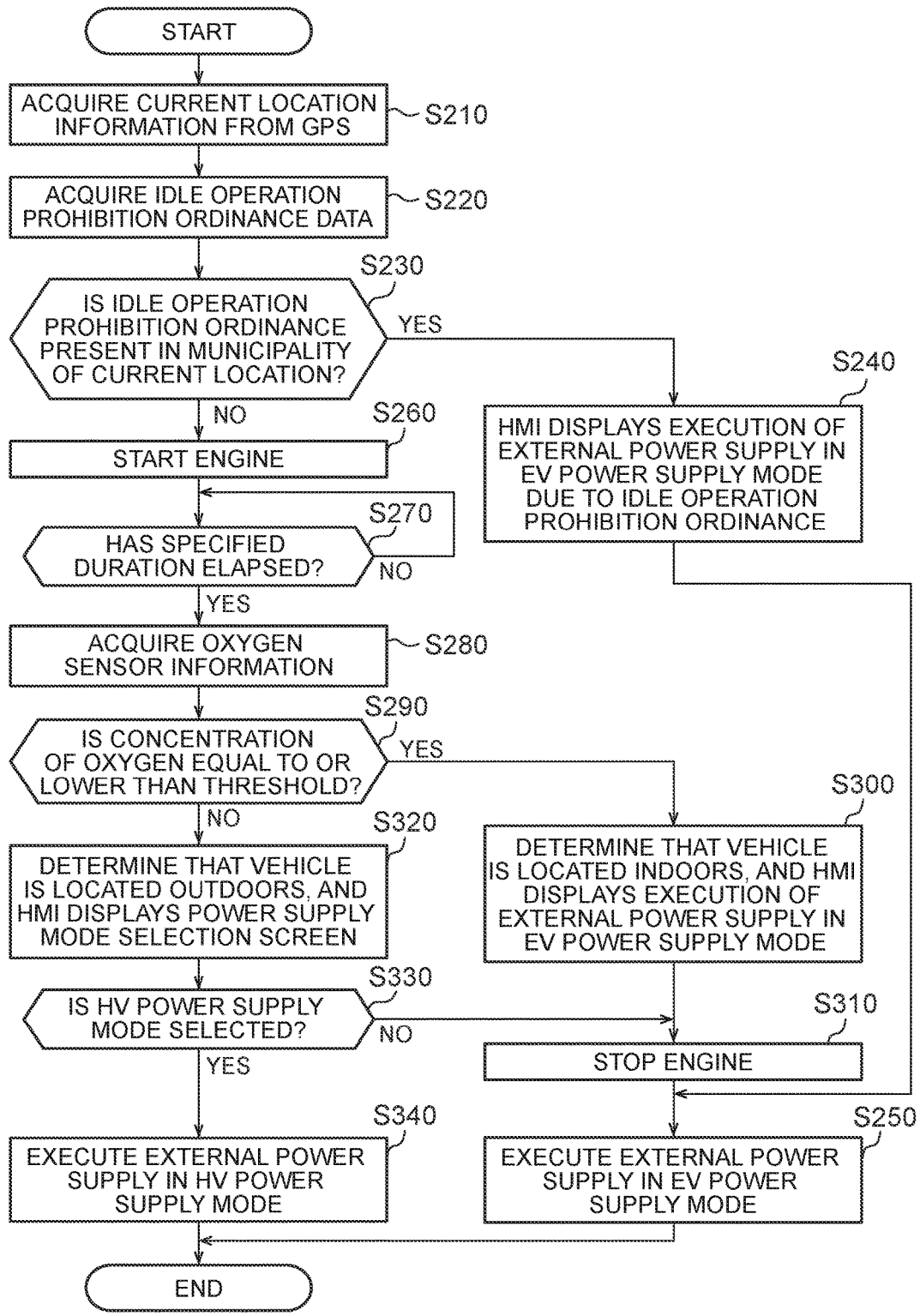
FIG. 8 is a flowchart illustrating a processing procedure executed by an ECU in the third embodiment during the external power supply.

FIG. 8 is a flowchart illustrating a processing procedure executed by the ECU 42C in the third embodiment during the external power supply. This flowchart corresponds to the flowchart in the first embodiment shown in FIG. 3 and the flowchart in the second embodiment shown in FIG. 6. Also in this flowchart, the processing procedure is initiated when the connection of the power supply connector to the power supply port 36 is detected by the signal from the power supply port 36 and the user commands the initiation of the external power supply on the HMI unit 44 or the like, for example.

Referring to FIG. 8, processing in steps S210 to S250 is the same as the processing in steps S10 to S50 illustrated in FIG. 3. Then, if it is confirmed in step S230 that the idle operation prohibition ordinance is not enacted in the municipality of the current location (NO in step S230), the ECU 42C outputs a signal to start the engine 12 to the engine 12 and the PCU 28 and starts the engine 12 by using the generator 16 (step S260).

After specified duration has elapsed since the start of the engine 12 (YES in step S270), the ECU 42C acquires the detection value of the oxygen sensor 70 (step S280). Then, on the basis of the detection value of the oxygen sensor 70, the ECU 42C determines whether the concentration of oxygen around the hybrid vehicle 10C is equal to or lower than a threshold (step S290). This threshold indicates that the concentration of oxygen is lowered because the inside of the building is filled with the exhaust gas of the engine 12.

If it is determined in step S290 that the concentration of oxygen is equal to or lower than the threshold (YES in step S290), the ECU 42C determines that the hybrid vehicle 10C is located indoors. Furthermore, the ECU 42C notifies the HMI unit 44 that the external power supply is executed in the EV power supply mode due to the indoor location of the hybrid vehicle 10C, and the HMI unit 44 displays such a fact (step S300). Then, the ECU 42C stops the engine 12 (step S310). The processing proceeds to step S250, and the ECU 42C executes the external power supply in the EV power supply mode.

On the other hand, if it is determined in step S290 that the concentration of oxygen is higher than the threshold (NO in step S290), the ECU 42C determines that the hybrid vehicle 10C is located outdoors. Then, the ECU 42C notifies the HMI unit 44 to display the power supply mode selection screen on which the user commands the power supply mode, and the HMI unit 44 displays the power supply mode selection screen (step S320).

If the user selects the HV power supply mode on the HMI unit 44 (YES in step S330), the ECU 42C continues the actuation of the engine 12 and executes the external power supply in the HV power supply mode (step S340). On the other hand, if the EV power supply mode is selected in step S330 (NO in step S330), the processing proceeds to step S310, and the ECU 42C stops the engine 12 and executes the external power supply in the EV power supply mode.

As it has been described so far, in this third embodiment, it is determined whether the vehicle is located indoors or outdoors on the basis of the detection value of the oxygen sensor 70. Therefore, also according to this third embodiment, when the hybrid vehicle 10C is located indoors, it is possible to reduce a chance that the inside of the building is filled with the exhaust gas due to the selection of the HV power supply mode as in the second embodiment.

Although not particularly shown, in the second and third embodiments, the data of the municipalities, each of which enacts the idle operation prohibition ordinance, may also be stored in storage units provided in the hybrid vehicles 10B, 10C as in the above-modified example.

It should be understood that the embodiments disclosed herein are illustrative in all respects and not restrictive. The scope of the disclosure is defined by the claims rather than the description of the above embodiments, and intends to include all modifications falling within the claims and equivalents thereof.

What is claimed is:

1. A hybrid vehicle configured to execute external power supply for supplying electric power from the vehicle to outside of the vehicle, the hybrid vehicle comprising:
   a power storage device;
   an engine;
   a generator configured to generate the electric power by using output of the engine; and
   an electronic control unit configured to
      execute control for executing the external power supply by selecting one of a first power supply mode in which the engine and the generator are actuated to execute the external power supply and a second power supply mode in which the engine and the generator are stopped and the external power supply is executed by using the electric power stored in the power storage device,
      acquire a current location of the hybrid vehicle,
      acquire first information indicative of an area where an idle operation of the engine during parking is prohibited, and
      select the second power supply mode when the current location is in the area indicated by the first information at the time of executing the external power supply.

2. The hybrid vehicle according to claim 1 further comprising a detector configured to detect a situation around the hybrid vehicle, wherein the electronic control unit is configured to select the second power supply mode when the electronic control unit determines that the hybrid vehicle is located indoors on the basis of second information output by the detector and the current location is not in the area.

3. The hybrid vehicle according to claim 1 further comprising a detector configured to detect a situation around the hybrid vehicle, wherein
the electronic control unit is configured to execute the external power supply in a mode selected by a user from the first power supply mode and the second power supply mode when the current location is not in the area and the electronic control unit determines that the hybrid vehicle is located outdoors on the basis of second information output by the detector.

4. The hybrid vehicle according to claim 1 further comprising an alarm configured to notify the user of selection of the second power supply mode due to a fact that the current location is in the area when the current location is in the area at the time of executing the external power supply.

5. The hybrid vehicle according to claim 1, wherein the electronic control unit is configured to acquire the first information from a server located the outside of the vehicle via a communication network.

6. The hybrid vehicle according to claim 1 further comprising a storage device configured to store the first information, wherein
the electronic control unit is configured to acquire the first information from the storage device.

7. A control method of a hybrid vehicle configured to execute external power supply for supplying electric power from the vehicle to outside of the vehicle, the hybrid vehicle including a power storage device, an engine, a generator configured to generate the electric power by using output of the engine, and an electronic control unit,
the control method comprising:
executing, by the electronic control unit, the external power supply by selecting one of a first power supply mode in which the engine and the generator are actuated to execute the external power supply and a second power supply mode in which the engine and the generator are stopped and the external power supply is executed by using the electric power stored in the power storage device;
acquiring, by the electronic control unit, a current location of the hybrid vehicle;
acquiring, by the electronic control unit, first information indicative of an area where an idle operation of the engine during parking is prohibited; and
selecting, by the electronic control unit, the second power supply mode when the current location is in the area indicated by the first information at the time of executing the external power supply.

\* \* \* \* \*